(12) United States Patent  
Hibi et al.

(10) Patent No.: US 8,877,869 B2
(45) Date of Patent: Nov. 4, 2014

(54) METHOD FOR SELECTING ORGANIC SULFUR COMPOUND FOR GOLF BALL, METHOD FOR PRODUCING GOLF BALL, AND GOLF BALL

(75) Inventors: Ayaka Hibi, Kobe (JP); Chiemi Mikura, Kobe (JP); Kazuhisa Fushihara, Kobe (JP); Yumi Kanemitsu, Kobe (JP); Mikio Yamada, Kobe (JP)

(73) Assignee: SRI Sports Limited, Kobe (JP)

( * ) Notice: Subject to any disclaimer, the term of this patent is extended or adjusted under 35 U.S.C. 154(b) by 390 days.

(21) Appl. No.: 13/277,656

(22) Filed: Oct. 20, 2011

(65) Prior Publication Data

US 2012/0135823 A1    May 31, 2012

(30) Foreign Application Priority Data

Nov. 30, 2010  (JP) ................. 2010-266800

(51) Int. Cl.
| | |
|---|---|
| A63B 37/00 | (2006.01) |
| A63B 37/06 | (2006.01) |
| C08K 5/37 | (2006.01) |
| C08K 5/375 | (2006.01) |
| C08L 9/00 | (2006.01) |
| A63B 37/02 | (2006.01) |
| A63B 45/00 | (2006.01) |

(52) U.S. Cl.
CPC ............. *A63B 37/02* (2013.01); *A63B 37/0074* (2013.01); *A63B 37/0039* (2013.01); *A63B 45/00* (2013.01); *C08K 5/375* (2013.01); *A63B 37/0076* (2013.01); *A63B 37/0003* (2013.01); *A63B 37/0073* (2013.01); *A63B 37/0051* (2013.01)
USPC ........... 525/261; 525/257; 525/274; 473/371; 473/372; 473/377

(58) Field of Classification Search
None
See application file for complete search history.

(56) References Cited

U.S. PATENT DOCUMENTS

| | | | |
|---|---|---|---|
| 6,837,803 B2 * | 1/2005 | Nanba et al. ................. 473/351 |
| 2003/0032501 A1 | 2/2003 | Sakagami et al. | |
| 2003/0050136 A1 | 3/2003 | Mano et al. | |
| 2003/0064827 A1 | 4/2003 | Sakagami et al. | |
| 2003/0119989 A1 | 6/2003 | Ladd et al. | |
| 2005/0245652 A1 * | 11/2005 | Bulpett et al. ................. 524/289 |

FOREIGN PATENT DOCUMENTS

| | | | |
|---|---|---|---|
| JP | 4-70034 B2 | 11/1992 | |
| JP | 2001-178851 A | 7/2001 | |
| JP | 2001-327629 A | 11/2001 | |
| JP | 2001327630 | * 11/2001 | |
| JP | 2002-224244 A | 8/2002 | |
| JP | 2002-338752 A | 11/2002 | |
| JP | 2003-33447 A | 2/2003 | |
| JP | 2003-38682 A | 2/2003 | |
| JP | 2003-164545 A | 6/2003 | |
| JP | 2004-41734 A | 2/2004 | |

OTHER PUBLICATIONS

Brooker, Comparison of the X-Ray Structures of the Sodium . . . ; J. Chemical Society Chemical Communications (1991) p. 144-146.*
English translation of Japanese Office Action dated Mar. 4, 2014 for Japanese Application No. 2010-266800.

* cited by examiner

*Primary Examiner* — David Buttner
(74) *Attorney, Agent, or Firm* — Birch, Stewart, Kolasch & Birch, LLP

(57) ABSTRACT

An object of the present invention is to provide a golf ball having high resilience. The gist of the present invention resides in selecting an organic sulfur compound used for a golf ball rubber composition containing (a) a base rubber, (b) a co-crosslinking agent, (c) a crosslinking initiator, and (d) the organic sulfur compound from organic sulfur compounds having specific structures such that a sum of substituent constants of the substituents X in a structure represented by the following formula (4) is 0.2 or more and SP value of the structure represented by the following formula (4) is in a range from 19.0 $(J/cm^3)^{1/2}$ to 24.0 $(J/cm^3)^{1/2}$ and using the same.

(4)

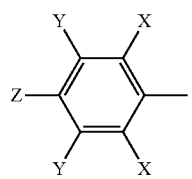

9 Claims, No Drawings

METHOD FOR SELECTING ORGANIC SULFUR COMPOUND FOR GOLF BALL, METHOD FOR PRODUCING GOLF BALL, AND GOLF BALL

FIELD OF THE INVENTION

The present invention relates to a golf ball having high resilience, more particularly to a technology for improving a golf ball rubber composition.

DESCRIPTION OF THE RELATED ART

Conventionally, as a rubber material to be used for a core of a golf ball, in order to improve the resilience of the obtained core, typically used is a material which is obtained by blending a high-cis polybutadiene as a base rubber and a co-crosslinking agent such as zinc acrylate, further adding a crosslinking initiator thereto, and conducting a radical polymerization of the base rubber and the co-crosslinking agent. It is known that adding a small amount of an organic sulfur compound or the like to a rubber composition containing a base rubber, a co-crosslinking agent, and a crosslinking initiator as described above further improves the resilience of the core obtained from the rubber composition (e.g., Japanese Patent Publication Nos. 2001-178851 A and 2003-38682 A).

For example, Japanese Patent Publication No. H04-70034 B discloses a golf ball whose internal core is produced from a rubber composition in which zinc acrylate as a co-crosslinking agent, a higher fatty acid such as palmitic acid, stearic acid, and myristic acid as a co-crosslinking activator, zinc oxide as another co-crosslinking activator, and a reaction rate retarder such as 2,5-di-tert-butylhydroquinone, are blended with a rubber. Japanese Patent Publication No. 2004-41734 A discloses a golf ball whose core contains a material which is produced by a conversion reaction of a certain amount of a polybutadiene containing a first trans-isomer content, a free radical source, and a cis-trans catalyst containing a component of Group VIA in the periodic table.

Japanese Patent Publication No. 2001-327629 A discloses a solid golf ball in which at least one layer of a core is formed by vulcanizing and molding a rubber composition which contains a base rubber, a co-crosslinking agent, an organic peroxide, a filler, and a specific organic sulfur compound having a substituent with a substituent constant of 1.42 or more. Japanese Patent Publication No. 2002-338752 A discloses a solid golf ball in which at least one layer of a core is formed by vulcanizing and molding a rubber composition which contains a base rubber, a co-crosslinking agent, an organic peroxide, and tribromothiophenol, tetrabromothiophenol, or a monovalent or bivalent metal salt thereof. Japanese Patent Publication No. 2003-033447 A discloses a solid golf ball in which at least one layer of a core is formed by vulcanizing and molding a rubber composition which contains a base rubber, a co-crosslinking agent, an organic peroxide, and a disulfide compound which includes at least one member selected from bis(bromophenyl)disulfide, bis(dibromophenyl)disulfide, bis(tribromophenyl)disulfide, bis(tetrabromophenyl)disulfide, and bis(pentabromophenyl)disulfide. A deformation amount of the core when applying a load from 98N as an initial load to 1275 N as a final load to the core, is 3.54 mm to 6.0 mm.

SUMMARY OF THE INVENTION

An object of the present invention is to provide a method for selecting an organic sulfur compound suitable for providing a golf ball having high resilience, a method for producing a golf ball having high resilience, and a golf ball having high resilience.

A part of the inventors of the present invention have studied a relationship between positions of the substituents of the aromatic ring and resilience of the resultant golf ball, with respect to thiophenols, diphenyl disulfides or metal salts thereof which are used for the rubber composition. As a result, they have found that an improved effect of the resilience becomes larger when a substituent enhancing resilience is attached at ortho position to a sulfur bond as shown in the following chemical formulae (5) to (8), and does not become so large even when the substituent enhancing resilience is attached at meta- and para-positions and filed a patent application (Japanese Patent Application No. 2009-251192).

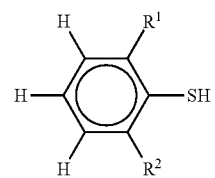

(5)

(wherein $R^1$ and $R^2$ each independently represent Br, F, or $CF_3$)

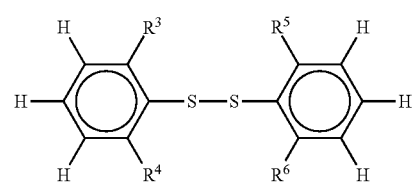

(6)

(wherein $R^3$ to $R^6$ each independently represent Br, F, or $CF_3$)

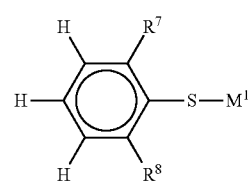

(7)

(wherein $R^7$ and $R^8$ each independently represent Br, F, or $CF_3$, and $M^1$ represents a monovalent metal atom)

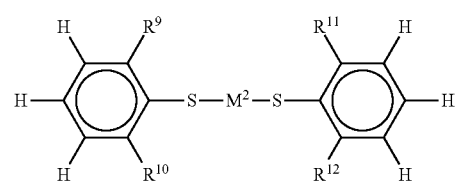

(8)

(wherein $R^9$ to $R^{12}$ each independently represent Br, F, or $CF_3$, and $M^2$ represents a bivalent metal atom)

The inventors of the present invention have further studied and made the present invention based on the findings that if SP value of the specific structure of the above organic sulfur compound is in a range from 19.0 $(J/cm^3)^{1/2}$ to 24.0 $(J/cm^3)^{1/2}$, the resilience of the resultant golf ball is further improved due to the enhanced compatibility of the organic sulfur compound to (b) the co-crosslinking agent. That is, the present invention provides a method for selecting an organic sulfur compound for a golf ball comprising selecting an organic sulfur compound used for a rubber composition containing (a) a base rubber, (b) a co-crosslinking agent, (c) a crosslinking initiator, and (d) the organic sulfur compound from at least one organic sulfur compound represented by following formulae (1) to (3) such that a sum of substituent constants of the substituents X in a structure represented by a following formula (4) is 0.2 or more and SP value of the structure represented by the following formula (4) is in a range from 19.0 $(J/cm^3)^{1/2}$ to 24.0 $(J/cm^3)^{1/2}$.

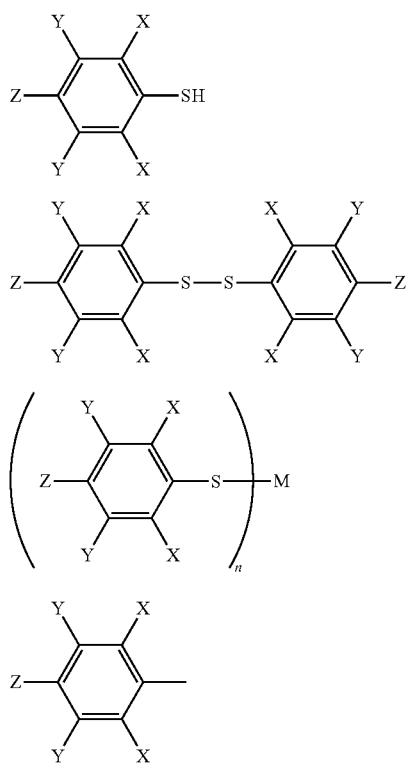

(wherein the substituent groups X, Y, Z may be same or different in the formulae (1) to (4), and n is a natural number equal to or larger than 1, M represents a metal having a valance equal to or lager than 1 in the formula (3).)

If an organic sulfur compound is added to a rubber composition used for a golf ball, S—S bonds or C—S bonds are likely to be dissociated under vulcanizing conditions and generate radicals, and the generated radicals affect a butadiene main chain or the like. In other words, it is thought that the organic sulfur compound affects crosslinking system between a base rubber and a co-crosslinking agent, thereby improving the resilience performance. In the present invention, among such organic sulfur compounds, use of the organic sulfur compound including at least one organic sulfur compound represented by the above formulae (1) to (3), wherein a sum of substituent constants of the substituents X in a structure represented by the above formula (4) is 0.2 or more and SP value of the structure represented by the above formula (4) is in a rage from 19.0 $(J/cm^3)^{1/2}$ to 24.0 $(J/cm^3)^{1/2}$ provides a great effect of improving the resilience.

The reason why the great effect of improving the resilience can be obtained by the addition of the organic sulfur compound including at least one organic sulfur compound represented by the above formulae (1) to (3), wherein a sum of substituent constants of the substituents X in a structure represented by the above formula (4) is 0.2 or more and SP value of the structure represented by the above formula (4) is in a range from 19.0 to $(J/cm^3)^{1/2}$ 24.0 $(J/cm^3)^{1/2}$, is not necessarily clear, but it can be considered as follows. The substituents X do not simply influence the generation of radicals from the organic sulfur compound, but influence the control of a crosslinking reaction which takes place between the base rubber and the co-crosslinking agent. In other words, as a result of electron-withdrawing substituents X being attached, the stability of a transition state formed during the reaction of the organic sulfur compound with the base rubber and the co-crosslinking agent, changes, and thus the activation energy which influences the reaction becomes small. Here, the stability of the transition state is almost not influenced by substituents which are attached at meta position and para position with respect to a bond to the sulfur element in the organic sulfur compound, and the substituents X attached at ortho position are important thereto. Further, if the SP value of the structure represented by the above formula (4) is in a range from 19.0 $(J/cm^3)^{1/2}$ to 24.0 $(J/cm^3)^{1/2}$, the compatibility to (b) the co-crosslinking agent is enhanced. As a result, the reactivity of the organic sulfur compound, the base rubber, and the co-crosslinking agent is further enhanced.

The present invention further provides a method for producing a golf ball comprising the steps of selecting an organic sulfur compound from at least one organic sulfur compound represented by the above formulae (1) to (3) such that a sum of substituent constants of the substituents X in a structure represented by the above formula (4) is 0.2 or more and SP value of the structure represented by the above formula (4) is in a range from 19.0 $(J/cm^3)^{1/2}$ to 24.0 $(J/cm^3)^{1/2}$, blending the selected organic sulfur compound, (a) a base rubber, (b) a co-crosslinking agent, and (c) a crosslinking initiator to prepare a rubber composition, and forming at least a part of a constituting member of the golf ball from the rubber composition.

The present invention yet further provides a golf ball having a constituting member, wherein at least a part of the constituting member is formed from a rubber composition containing (a) a base rubber, (b) a co-crosslinking agent, (c) a crosslinking initiator, and (d) an organic sulfur compound, wherein (d) the organic sulfur compound includes at least one organic sulfur compound represented by the above formulae (1) to (3), and is such that a sum of substituent constants of the substituents X in a structure represented by the above formula (4) is 0.2 or more and SP value of the structure represented by the above formula (4) is in a range from 19.0 $(J/cm^3)^{1/2}$ to 24.0 $(J/cm^3)^{1/2}$.

According to the present invention, it is possible to select an organic sulfur compound suitable for producing a golf ball having high resilience, and it is also possible to provide a golf ball having high resilience by using the selected organic sulfur compound.

DESCRIPTION OF THE PREFERRED EMBODIMENT

The present invention provides a method for selecting an organic sulfur compound for a golf ball comprising selecting an organic sulfur compound used for a rubber composition containing (a) a base rubber, (b) a co-crosslinking agent, (c) a crosslinking initiator, and (d) the organic sulfur compound from at least one organic sulfur compound represented by the following formulae (1) to (3) such that a sum of substituent constants of the substituents X in a structure represented by the following formula (4) is 0.2 or more and SP value of the structure represented by the following formula (4) is in a range from 19.0 $(J/cm^3)^{1/2}$ to 24.0 $(J/cm^3)^{1/2}$.

The present invention further provides a method for producing a golf ball comprising the steps of blending the selected organic sulfur compound according to the above method, (a) a base rubber, (b) a co-crosslinking agent, and (c) a crosslinking initiator to prepare a rubber composition, and forming at least a part of a constituting member of the golf ball from the rubber composition.

The present invention further provides a golf ball having a constituting member, wherein at least a part of the constituting member is formed from a rubber composition containing (a) a base rubber, (b) a co-crosslinking agent, (c) a crosslinking initiator, and (d) an organic sulfur compound, wherein (d) the organic sulfur compound includes at least one organic sulfur compound represented by the following formulae (1) to (3), and is such that a sum of substituent constants of the substituents X in a structure represented by the following formula (4) is 0.2 or more and SP value of the structure represented by the following formula (4) is in a range from 19.0 $(J/cm^3)^{1/2}$ to 24.0 $(J/cm^3)^{1/2}$.

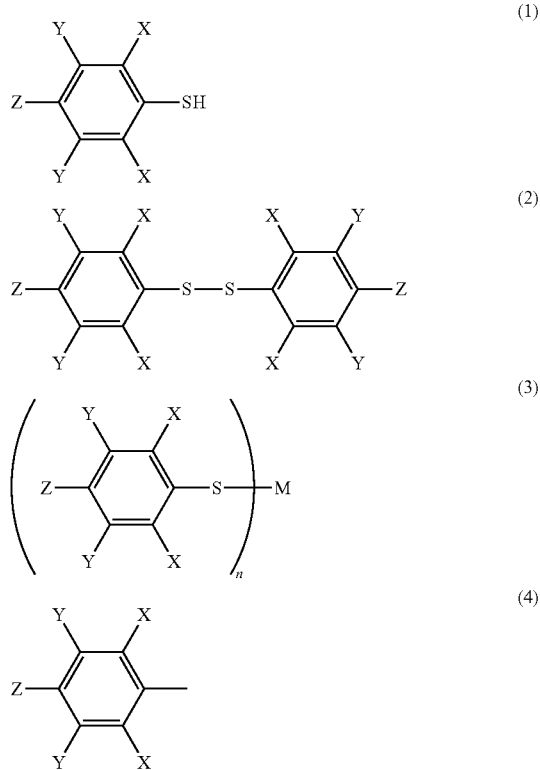

(wherein the substituent groups X, Y, Z may be same or different in the formulae (1) to (4), and n is a natural number equal to or larger than 1, M represents a metal having a valance equal to or larger than 1 in the formula (3).)

First, (d) the organic sulfur compound used in the present invention will be explained. (d) The organic sulfur compound includes at least one organic sulfur compound represented by the above formulae (1) to (3), wherein a sum of substituent constants of the substituents X in a structure represented by the above formula (4) is 0.2 or more and SP value of the structure represented by the above formula (4) is in a range from 19.0 $(J/cm^3)^{1/2}$ to 24.0 $(J/cm^3)^{1/2}$.

(d) The organic sulfur compound is such that a sum of substituent constants of the substituents X in a structure represented by the above formula (4) is 0.2 or more, more preferably 0.45 or more, even more preferably 0.52 or more. If the sum of substituent constants of the substituents X is 0.2 or more, the reactivity of the organic sulfur compound, the base rubber and the co-crosslinking agent is enhanced and the resilience of the resultant golf ball is also enhanced. The upper limit of the sum of substituent constants of the substituents X is, without limitation, preferably 3.0, more preferably 2.9.

In the present invention, the term "substituent constant" means a substituent constant in the Hammett's rule in which the influence of a substituent on the reaction rate or equilibrium of a benzene derivative is quantified. Although it is known that the Hammett's rule applies only to meta- and para-substituted benzene derivatives, the Hammett's rule can be also applied to ortho-substituted benzene derivatives in the present invention.

The Hammett's rule is represented by the following equation (x):

$$\log(K/K_0) = \rho\sigma \qquad (x)$$

(wherein K represents the reaction value for a compound which contain a substituent; $K_0$ represents the reaction value for the compound when the substituent is not contained, i.e., when the substituent is a hydrogen atom; ρ represents the reaction constant; and σ represents the substituent constant).

The reaction constant (ρ) in the above equation (x) depends on the reaction type and the reaction conditions such as temperature and the type of solvent, and is 1.00 in the case of substituted benzoic acid, and 0.49 in the case of substituted phenyl acetic acid. The substituent constant (σ) in the above equation (x) depends only on the type and position of the substituent, and not on the reaction type. The constant is 0.00 when no substituent is present, i.e., when the substituent is a hydrogen atom.

A method of determining the substituent constant for the structure in the above formula (4) will be specifically described. For example, in the case of 2,6-dibromothiophenol, the substituent constant of a bromo group at ortho position is 0.21, and two bromo groups are present. Thus, the substituent constant for the structure in the above formula (4) is the sum of the two substituent constants, which is 0.42. Similarly, in the case of 2,6-difluorothiophenol, the substituent constant of a fluoro group at ortho position is 0.24, and two fluoro groups are present. Thus, the substituent constant for the structure in the above formula (4) is the sum of the two substituent constants, which is 0.48. It is noted that the influence between the two substituents is neglected to determine the substituent constant for the structure in the above formula (4).

Further, values in references (e.g., "Linear Free Energy Relationships" of Peter R. Wells, p 171 to 219; "Yuki Kagaku Josetsu (Introduction to Organic Chemistry)" of Kazuhiro Maruyama et al, p 113, Apr. 1, 1989, published by Kagaku-Dojin Publishing Co., Inc.) are used as the substituent constant used in the present invention.

(d) The organic sulfur compound used in the present invention is such that the SP value of the structure represented by the following formula (4) is preferably 19.0 or more $(J/cm^3)^{1/2}$, and is preferably 24.0 or less $(J/cm^3)^{1/2}$, more preferably 23.0 or less $(J/cm^3)^{1/2}$, even more preferably 21.5 or less $(J/cm^3)^{1/2}$. If the SP value falls within the above range, since the compatibility between (d) the organic sulfur compound and (b) the co-crosslinking agent is enhanced, the crosslinking reaction readily occurs. As a result, the resilience of the resultant golf ball is enhanced.

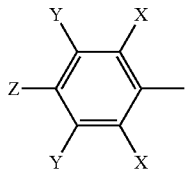

(4)

(wherein the substituent groups X, Y, Z may be same or different in the formula (4))

The SP value (δt) used in the present invention means δt defined by the following equations.

$$\delta d = \frac{\sum F_{di}}{V}, \delta p = \frac{\sqrt{\sum F_{pi}^2}}{V}, \delta h = \sqrt{\frac{\sum E_{hi}}{V}}$$

$$\delta_t^2 = \delta_d^2 + \delta_p^2 + \delta_h^2$$

In the equations, V means a volume V (cm³/mol) according to Fedors, and Fdi, Fpi, and Ehi are solubility parameter components by the method of Hoftyzer and Van Krevelen. Herein, δd is a London dispersion component δp is a dipole moment component, and δh is hydrogen bonding component. The method for calculating SP values are described in "Properties of Polymers, chapter 7 (D. W. VANKREVELEN, Publisher: ELSEVIER, Published year: Third impression 2003)" in detail. Fdi, Fpi, Ehi and V of main functional groups are shown in table 1.

TABLE 1

| Kind of atomic group | Fdi $J^{1/2} \cdot cm^{3/2} \cdot mol^{-1}$ | Fpi $J^{1/2} \cdot cm^{3/2} \cdot mol^{-1}$ | Ehi J/mol | V cm³/mol |
|---|---|---|---|---|
| —CH₃ | 420 | 0 | 0 | 33.5 |
| —CH₂— | 270 | 0 | 0 | 16.1 |
| —CH— | 80 | 0 | 0 | −1.0 |
| —C— | −70 | 0 | 0 | −19.2 |
| =CH₂ | 400 | 0 | 0 | 28.5 |
| =CH— | 200 | 0 | 0 | 13.5 |
| =C< | 70 | 0 | 0 | −5.5 |
| Phenyl | 1430 | 110 | 0 | 71.4 |
| Phenylene (o, m, p) | 1270 | 110 | 0 | 52.4 |
| —F | (220) | — | — | 18.0 |
| —Cl | 450 | 550 | 400 | 24.0 |
| —Br | (550) | — | — | 30.0 |
| —CN | 430 | 1100 | 2500 | 24.0 |
| —OH | 210 | 500 | 20000 | 10.0 |
| —O— | 100 | 400 | 3000 | 3.8 |
| —COH (aldehyde) | 470 | 800 | 4500 | 22.3 |
| —CO— | 290 | 770 | 2000 | 10.8 |
| —COOH | 530 | 420 | 10000 | 28.5 |

TABLE 1-continued

| Kind of atomic group | Fdi $J^{1/2} \cdot cm^{3/2} \cdot mol^{-1}$ | Fpi $J^{1/2} \cdot cm^{3/2} \cdot mol^{-1}$ | Ehi J/mol | V cm³/mol |
|---|---|---|---|---|
| —COO— | 390 | 490 | 7000 | 18.0 |
| HCOO- (formate) | 530 | — | — | 32.5 |
| —NH₂ | 280 | — | 8400 | 19.2 |
| —NH— | 160 | 210 | 3100 | 4.5 |
| —N< | 20 | 800 | 5000 | −9.0 |
| —NO₂ | 500 | 1070 | 1500 | 24.0 (aliphatic) |
| —S— | 440 | — | — | 12 |
| =PO₄— | 740 | 1890 | 13000 | 28.0 |

In the organic sulfur compounds represented by the above formulae (1) to (3), the substituent X includes, for example, electron-withdrawing groups such as $CF_3$ (trifluoromethyl), $COCH_3$ (acetyl), $COOCH_3$ (methoxycarbonyl), Cl, Br, I, and F. The substituent X more preferably includes at least one selected from the group consisting of $CF_3$, $COCH_3$, and $COOCH_3$. The substituent Y attached at meta position to the sulfur bond is preferably a substituent improving compatibility to (b) the co-crosslinking agent. Examples of the substituent Y are Cl, Br and H. The substituent Y is more preferably Cl or Br. Examples of the substituent Z are $CF_3$, $COCH_3$, $COOCH_3$, Cl, Br, I, F, and H. The substituent Z preferably includes $CF_3$, $COCH_3$, $COOCH_3$, or H. In the case that the substituent X is at least one selected from the group consisting of $CF_3$, $COCH_3$, and $COOCH_3$, it is preferable that the substituent Y includes Cl, Br, or H, and the substituent Z includes $CF_3$, $COCH_3$, $COOCH_3$ or H, and it is more preferable that the substituent Y includes Cl or Br and the substituent Z includes $CF_3$, $COCH_3$, $COOCH_3$ or H.

With respect to the organic sulfur compound represented by the above formula (3), n is a natural number equal to or larger than 1, preferably a natural number from 1 to 4. M is a metal atom having a valance equal to or larger than 1, preferably a monovalent to tetravalent metal atom. Among them, preferred is the organic sulfur compound where n=1 and M is a monovalent metal atom or the organic sulfur compound where n=2 and M is a divalent metal atom. The valence number of the metal atom generally corresponds to the number of n. The monovalent metal atom represented by M includes, for example, sodium, lithium, potassium, copper (I), silver (I) or the like. The divalent metal atom includes, for example, zinc, magnesium, calcium, strontium, barium, titanium (II), manganese (II), iron (II), cobalt (II), nickel (II), zirconium (II), tin (II) or the like. The trivalent metal atom includes, for example, aluminum (III), iron (III) or the like. The tetravalent metal atom includes, for example, titanium (IV), zirconium (IV) or the like.

The organic sulfur compound represented by the formula (1) includes, for example, 2,4,6-tri(trifluoromethyl)-3,5-dibromothiophenol (SP value:19.1), 2,4,6-tri(trifluoromethyl) thiophenol (SP value:19.4), 2,6-di(trifluoromethyl)-3,5-dibromothiophenol (SP value:19.51), 2,4,6-tri (trifluoromethyl)-3,5-dichlorothiophenol (SP value:19.72), 2,6-di(trifluoromethyl)thiophenol (SP value: 20.1), 2,6-di (trifluoromethyl)-3,5-dichlorothiophenol (SP value: 20.36), 2,4,6-tri(acetyl)-3,5-dibromothiophenol (SP value: 19.77), 2,6-di(acetyl)-3,5-dibromotiophenol (SP value: 20.13), 2,4, 6-tri(acetyl)-3,5-dichlorothiophenol (SF value: 20.32), 2,6-di (acetyl)-3,5-dichlorothiophenol (SP value: 20.9), 2,6-di (acetyl)thiophenol (SP value: 21.27), 2,4,6-tri (methoxycarbonyl)-3,5-dibromothiophenol (SP value: 20.31), 2,6-di(methoxycarbonyl)-3,5-dibromothiophenol (SP value:20.46), 2,3,4,5,6-penta(methoxycarbonyl)thiophenol (SP value: 20.5), 2,4,6-tri(methoxycarbonyl)-3,5-dichlorothiphenol (SP value: 20.78), 2,4,6-tri(methoxycarbonyl)thiophenol (SP value: 20.94), 2,6-di(methoxycarbonyl)-3,5-dichlorothiophenol (SP value: 21.13), 2,6-di(methoxycarbonyl)thiophenol (SP value: 21.36) or the like.

The organic sulfur compound represented by the formula (2) includes, for example, disulfides of the organic sulfur compounds represented by the formula (1). The organic sulfur compound represented by the formula (3) includes, for example, metal salts of the organic sulfur compounds represented by the formula (1). The metal constituting the metal salts includes, for example, zinc, magnesium, sodium or the like, more preferably zinc.

The blending amount of (d) the organic sulfur compound is preferably 0.05 part by mass or more, and more preferably 0.1 part by mass or more, and is preferably 3.0 parts by mass or less, and more preferably 2.0 parts by mass or less, with respect to 100 parts by mass of (a) the base rubber. If the blending amount of (d) the organic sulfur compound is less than 0.05 part by mass, the effect of addition of (d) the organic sulfur compound may not be obtained, and thus the resilience of the resultant golf ball may not be improved. On the other hand, if the blending amount of (d) the organic sulfur compound exceeds 3.0 parts by mass, the compression deformation amount of the resultant golf ball may become large, resulting in lower resilience.

As (a) the base rubber used in the present invention, natural rubber and/or synthetic rubber can be used. For example, polybutadiene rubber, natural rubber, polyisoprene rubber, styrene polybutadiene rubber, ethylene-propylene-diene rubber (EPDM), or the like can be used. These rubbers may be used solely or two or more of these rubbers may be used in combination. Among them, typically preferred is the high cis-polybutadiene having cis-1,4 bond in a proportion of 40 mass % or more, more preferably 80 mass % or more, even more preferably 90 mass % or more, in view of its superior resilience property.

The high-cis polybutadiene preferably has 1,2-vinyl bonds in a content of 2 mass % or less, more preferably 1.7 mass % or less, and even more preferably 1.5 mass % or less. If the content of 1,2-vinyl bonds is excessively high, the resilience may be lowered.

The high-cis polybutadiene is preferably one synthesized using a rare earth element catalyst. When a neodymium catalyst, which employs a neodymium compound which is a lanthanum series rare earth element compound, is used, a polybutadiene rubber having a high content of cis-1,4 bond and a low content of 1,2-vinyl bond is obtained with excellent polymerization activity. Such a polybutadiene rubber is particularly preferred.

The high-cis polybutadiene preferably has a Mooney viscosity ($ML_{1+4}$ (100° C.)) of 50 or more, more preferably 51 or more, even more preferably 52 or more, and most preferably 54 or more, and preferably has a Mooney viscosity ($ML_{1+4}$ (100° C.)) of 140 or less, more preferably 120 or less, even more preferably 100 or less, and most preferably 80 or less. It is noted that the Mooney viscosity ($ML_{1+4}$ (100° C.)) in the present invention is a value measured according to JIS K6300 using an L rotor under the conditions of: a preheating time of 1 minute; a rotor revolution time of 4 minutes; and a temperature of 100° C.

The high-cis polybutadiene preferably has a molecular weight distribution Mw/Mn (Mw: weight average molecular weight, Mn: number average molecular weight) of 2.0 or more, more preferably 2.2 or more, even more preferably 2.4 or more, and most preferably 2.6 or more, and preferably has a molecular weight distribution Mw/Mn of 6.0 or less, more preferably 5.0 or less, even more preferably 4.0 or less, and most preferably 3.4 or less. If the molecular weight distribution (Mw/Mn) of the high-cis polybutadiene is excessively low, the processability deteriorates. If the molecular weight distribution (Mw/Mn) of the high-cis polybutadiene is excessively high, the resilience may be lowered. It is noted that the measurement of the molecular weight distribution is conducted by gel permeation chromatography ("HLC-8120GPC", manufactured by Tosoh Corporation) using a differential refractometer as a detector under the conditions of column: GMHHXL (manufactured by Tosoh Corporation), column temperature: 40° C., and mobile phase: tetrahydrofuran, and calculated by converting, using polystyrene standard.

(b) The co-crosslinking agent is not particularly limited, as long as it has the action of crosslinking a rubber molecule by graft polymerization to a base rubber molecular chain. For example, an α,β-unsaturated carboxylic acid having 3 to 8 carbon atoms, or a metal salt thereof can be used, and preferable examples thereof include acrylic acid, methacrylic acid, and metal salts thereof. Examples of the metal for forming the metal salt include zinc, magnesium, calcium, aluminum, and sodium. As (b) the co-crosslinking agent, zinc acrylate is preferred, because the obtained golf ball has high resilience.

SP value of (b) the co-crosslinking agent is preferably 18.0 or more, more preferably 19.0 or more, even more preferably 20.0 or more, and is preferably 24.0 or less, more preferably 23.0 or less, even more preferably 22.0 or less. (b) The co-crosslinking agent having SP value in the above range is readily compatible to (d) the organic sulfur compound. In addition, the difference (absolute value) in SP value between (d) the organic sulfur compound and (b) the co-crosslinking agent is preferably 6.0 or less, more preferably 5.0 or less, even more preferably 4.0 or less. If the difference (absolute value) in SP value falls within the above range, the compatibility to (d) the organic sulfur compound is further enhanced. SP value of (b) the co-crosslinking agent is as follows. For example, acrylic acid has SP value of 20.84, and methacrylic acid has SP value of 20.52.

The blending amount of (b) the co-crosslinking agent is preferably 15 parts by mass or more, more preferably 20 parts by mass or more, and is preferably 45 parts by mass or less, and more preferably 35 parts by mass or less, with respect to 100 parts by mass of (a) the base rubber. If the blending amount of (b) the co-crosslinking agent is less than 15 parts by mass, the blending amount of (c) the crosslinking initiator, which will be described later, must be increased to have an appropriate hardness of the constituting member formed from the rubber composition. Thus, the resilience of the golf ball tends to decrease. On the other hand, if the blending amount of (b) the co-crosslinking agent exceeds 45 parts by mass, the constituting member formed from the rubber composition becomes too hard, and thus the shot feeling of the golf ball may deteriorate.

(c) The crosslinking initiator is blended in order to crosslink (a) the base rubber. As (c) the crosslinking initiator, an organic peroxide is preferred. Specific examples of the organic peroxide include organic peroxides such as dicumyl peroxide, 1,1-bis(t-butylperoxy)-3,3,5-trimethylcyclohexane, 2,5-dimethyl-2,5-di(t-butylperoxy)hexane, and di-t-butyl peroxide. These organic peroxides may be used solely or two or more of these organic peroxides may be used in combination. Among them, dicumyl peroxide is preferably used.

The blending amount of (c) the crosslinking initiator is preferably 0.2 part by mass or more, and more preferably 0.3 part by mass or more, and is preferably 5.0 parts by mass or less, and more preferably 2.5 parts by mass or less, with respect to 100 parts by mass of (a) the base rubber. If the blending amount of (c) the crosslinking initiator is less than 0.2 parts by mass, the constituting member formed from the rubber composition becomes too soft, and thus the golf ball may have the low resilience. If the blending amount of (c) the crosslinking initiator exceeds 5.0 parts by mass, the amount of (b) the co-crosslinking agent must be decreased in order to obtain the appropriate hardness of the constituting member formed from the rubber composition, which tends to cause the insufficient resilience.

In addition to (a) the base rubber, (b) the co-crosslinking agent, (c) the crosslinking initiator, and (d) the organic sulfur compound, the rubber composition used in the present invention may contain additives, such as a pigment, a filler for adjusting weight, an antioxidant, a peptizing agent, and a softener, where necessary.

Examples of the pigment blended in the rubber composition include a white pigment, a blue pigment, and a purple pigment. As the white pigment, titanium oxide is preferably used. The type of titanium oxide is not particularly limited, but rutile type is preferably used because of the high opacity. In addition, the blending amount of titanium oxide is preferably 0.5 parts by mass or more, and more preferably 2 parts by mass or more, and is preferably 8 parts by mass or less, and more preferably 5 parts by mass or less, with respect to 100 parts by mass of (a) the base rubber.

It is also preferred if the rubber composition contains both a white pigment and a blue pigment. The blue pigment is blended in order to cause white color to be vivid, and examples thereof include ultramarine blue, cobalt blue, and phthalocyanine blue. In addition, examples of the purple pigment include anthraquinone violet, dioxazine violet, and methyl violet.

The blending amount of the blue pigment is preferably 0.001 part by mass or more, and more preferably 0.05 part by mass or more, and is preferably 0.2 part by mass or less, and more preferably 0.1 part by mass or less, with respect to 100 parts by mass of (a) the base rubber. If the blending amount of the blue pigment is less than 0.001 part by mass, blueness is insufficient, and the color looks yellowish. If the blending amount of the blue pigment exceeds 0.2 part by mass, blueness is excessively strong, and a vivid white appearance is not provided.

The filler blended in the rubber composition is used as a weight adjusting agent for mainly adjusting the density of a golf ball obtained as an final product so as to be in the range of 1.0 to 1.5. As the filler, any filler which is generally blended in a golf ball may be used, and examples of the filler include inorganic fillers (specifically, zinc oxide, barium sulfate, calcium carbonate, or the like), powder of a metal with a high specific gravity (e.g., tungsten powder, molybdenum powder, or the like), and mixtures thereof. Zinc oxide, which also functions as a vulcanization aid, is particularly preferred. The blending amount of the filler is preferably 0.5 part by mass or more, more preferably 1 part by mass or more, and is preferably 30 parts by mass or less, more preferably 25 parts by mass or less, and more preferably 20 parts by mass or less, with respect to 100 parts by mass of (a) the base rubber. If the blending amount is less than 0.5 part by mass, it is difficult to adjust the weight. If the blending amount exceeds 30 parts by mass, the weight ratio of the rubber component becomes small, and thus the resilience is lowered.

The blending amount of the antioxidant is preferably 0.1 parts by mass or more and 1 part by mass or less, with respect to 100 parts by mass of (a) the base rubber. In addition, the blending amount of the peptizing agent is preferably 0.1 part by mass or more and 5 parts by mass or less, with respect to 100 parts by mass of (a) the base rubber.

The golf ball of the present invention has a constituting member, wherein at least a part of the constituting member is formed from a rubber composition containing (a) a base rubber, (b) a co-crosslinking agent, (c) a crosslinking initiator, and (d) an organic sulfur compound, wherein (d) the organic sulfur compound includes at least one organic sulfur compound represented by the above formulae (1) to (3), and is such that a sum of substituent constants of the substituents X in a structure represented by the above formula (4) is 0.2 or more and SP value of the structure represented by the above formula (4) is in a range from 19.0 $(J/cm^3)^{1/2}$ to 24.0 $(J/cm^3)^{1/2}$. In a preferable embodiment, the golf ball of the present invention comprises at least one core layer and a cover covering the core, wherein at least one layer of the core is formed from the above rubber composition.

Examples of the golf ball of the present invention include a one-piece golf ball whose golf ball body is formed from the above rubber composition; a two-piece golf ball which has a core and a cover covering the core, wherein the core is formed from the above rubber composition; a multi-piece golf ball (including three-piece golf ball) which has: a core including a center and at least one intermediate layer covering the center; and a cover covering the core, wherein at least a part of the center and/or the intermediate layer is formed from the above rubber composition.

In the case that the golf ball of the present invention is a one-piece golf ball having a diameter of 42.67 mm to 42.82 mm, a compression deformation amount of the one-piece golf ball (an amount of compression of the golf ball in the compression direction thereof) when applying a load from 98 N as an initial load to 1275 N as a final load is preferably 2.3 mm or more, more preferably 2.4 mm or more, and even more preferably 2.5 mm or more, and is preferably 4.0 mm or less, more preferably 3.9 mm or less, and even more preferably 3.8 mm or less. If the compression deformation amount is 2.3 mm or more, the one-piece golf ball does not become too hard, and the better shot feeling is provided. If the compression deformation amount is 4.0 mm or less, the golf ball does not become too soft, and the better resilience is provided.

The following will describe a core in the case where the golf ball of the present invention is a two-piece golf ball, a three-piece golf ball, or a multi-piece golf ball.

The core of the golf ball of the present invention includes, for example, a single-layered core, and a multi-layered core consisting of a center and at least one intermediate layer covering the center. In the case of the multi-layered core, at least one layer of the core may be formed from the above rubber composition. However, the proportion of the volume of the layer formed from the above rubber composition, to the total core volume, is preferably 30% or more, more preferably 50% or more, and even more preferably 70% or more. Although all the layers of the multi-layered core may be formed from the above rubber composition, it is preferable that the center of the innermost layer is formed from the above rubber composition. It is noted that the core of the golf ball of the present invention is most preferably a single-layer core formed from the above rubber composition.

The core preferably has a spherical shape. If the core does not have a spherical shape, the cover does not have a uniform thickness. As a result, there exist some portions where the performance of the cover is lowered. On the other hand, the center generally has the spherical shape, but the center may be provided with a rib on the surface thereof so that the surface of the spherical center is divided by the ribs, preferably the surface of the spherical center is evenly divided by the ribs. In one embodiment, the ribs are preferably formed as a part of the center in an integrated manner on the surface of the center, and in another embodiment, the ribs are formed as an intermediate layer on the surface of the spherical center.

The ribs are preferably formed along an equatorial line and meridians that evenly divide the surface of the spherical center, if the spherical center is assumed as the earth. For example, if the surface of the spherical center is evenly divided into 8, the ribs are formed along the equatorial line, any meridian as a standard, and meridians at the longitude 90 degrees east, longitude 90 degrees west, and the longitude 180 degrees east(west), assuming that the meridian as the standard is at longitude 0 degree. If the ribs are formed, the depressed portion divided by the ribs are preferably filled with a plurality of intermediate layers or with a single-layered intermediate layer that fills each of the depressed portions to make a core in the spherical shape. The shape of the ribs, without limitation, includes an arc or an almost arc (for example, a part of the arc is removed to obtain a flat surface at the cross or orthogonal portions thereof).

The core used in the golf ball of the present invention preferably has a diameter of 32.8 mm or larger, more preferably 33.6 mm or larger, and preferably has a diameter of 42.2 mm or smaller, more preferably 41.8 mm or smaller. If the diameter of the core is smaller than 32.8 mm, the cover must be made thicker than the desired thickness, resulting in the lowered resilience. On the other hand, if the diameter of the core is larger than 42.2 mm, the cover must be made thinner than the desired thickness, the durability of the cover may deteriorate.

In the case that the core has a diameter of from 32.8 mm to 42.2 mm, the compression deformation amount (deformation amount along the shrinkage direction) of the core when applying a load from 98 N as an initial load to 1275 N as a final load is preferably 2.0 mm or more, more preferably 2.5 mm or more, and even more preferably 3.0 mm or more, and is preferably 6.0 mm or less, more preferably 5.0 mm or less, and even more preferably 4.0 mm or less. If the compression deformation amount is 2.0 mm or more, the core does not become excessively hard and the shot feeling becomes better, while if the compression deformation amount is 6.0 mm or less, the core does not become excessively soft and the resilience is getting better.

Further, when the golf ball of the present invention is a three-piece golf ball or a multi-piece golf ball, the same material as a later-described cover material can be used as the material of the intermediate layer. Examples of the material of the intermediate layer include conventionally known ionomer resins as well as thermoplastic polyamide resins, thermoplastic polyester resins, thermoplastic polyurethane resins, and thermoplastic polystyrene resins. In addition, for the intermediate layer, a weight adjusting agent such as barium sulfate or tungsten, an antioxidant, a pigment, or the like may be blended.

Next, the cover of the golf ball of the present invention will be explained. Examples of the cover material constituting the cover include, various resins such as an ionomer resin, a polyester resin, polyurethane resins like a thermoplastic urethane resin and a thermosetting urethane resin, and a polyamide resin; and various thermoplastic elastomers such as a thermoplastic polyamide elastomer having a trade name "Pebax (registered trademark) (e.g. "Pebax 2533")" commercially available from Arkema Inc., a thermoplastic polyester elastomer having a trade name "Hytrel (registered trademark) (e.g. "Hytrel 3548" and "Hytrel 4047")" commercially available from Du Pont-Toray Co., Ltd., a thermoplastic polyurethane elastomer having a trade name "Elastollan (registered trademark) (e.g. "Elastollan XNY97A")" available from BASF Japan Ltd, and thermoplastic polystyrene elastomers having a trade name "Rabalon (registered trademark)(e.g. "Rabalon T3221C")" commercially available from Mitsubishi Chemical Corporation, and the like. These cover materials may be used solely or in combination of two or more types thereof.

Examples of the ionomer resin include one prepared by neutralizing at least a part of carboxyl groups in a copolymer, composed of ethylene and $\alpha,\beta$-unsaturated carboxylic acid having 3 to 8 carbon atoms with a metal ion; one prepared by neutralizing at least a part of carboxyl groups in a terpolymer composed of ethylene, $\alpha,\beta$-unsaturated carboxylic acid having 3 to 8 carbons atoms, and $\alpha,\beta$-unsaturated carboxylic acid ester with a metal ion; or a mixture of these two.

Metal ions for neutralization include: monovalent metal ions such as sodium ion, potassium ion, lithium ion, or the like; divalent metal ions such as zinc ion, calcium ion, magnesium ion, copper ion, manganese ion, or the like; trivalent metal ions such as aluminum ion, neodymium ion or the like. Among these metal ions, zinc ion is preferable, because the bonding strength of metal ion cluster is strong.

Specific examples of the ionomer resins include trade name "Himilan (registered trademark) (e.g. the binary copolymerized ionomer such as Himilan 1555 (Na), Himilan 1557 (Zn), Himilan 1605 (Na), Himilan 1706 (Zn), Himilan 1707 (Na), Himilan AM7311 (Mg), Himilan AM7329 (Zn); and the ternary copolymerized ionomer such as Himilan 1856 (Na), Himilan 1855 (Zn))" commercially available from Du Pont-Mitsui Polychemicals Co., Ltd.

Further, examples include "Surlyn (registered trademark) (e.g. the binary copolymerized ionomer such as Surlyn 8945 (Na), Surlyn 9945 (Zn), Surlyn 8140 (Na), Surlyn 8150 (Na), Surlyn 9120 (Zn), Surlyn 9150 (Zn), Surlyn 6910 (Mg), Surlyn 6120 (Mg), Surlyn 7930 (Li), Surlyn 7940 (Li), Surlyn AD8546 (Li); and the ternary copolymerized ionomer such as Surlyn 6320 (Mg), Surlyn 8120 (Na), Surlyn 8320 (Na), Surlyn 9320 (Zn))" and the ternary copolymerized ionomer such as "HPF 1000 (Mg), HPF 2000 (Mg)" commercially available from E.I. du Pont de Nemours and Company.

Further, examples include "Iotek (registered trademark) (e.g. the binary copolymerized ionomer such as Iotek 8000 (Na), Iotek 8030 (Na), Iotek 7010 (Zn), Iotek 7030 (Zn); and the ternary copolymerized ionomer such as Iotek 7510 (Zn), Iotek 7520 (Zn))" commercially available from ExxonMobil Chemical Corporation. It is noted that Na, Zn, Li, and Mg described in the parentheses after the trade names indicate metal types of neutralizing metal ions for the ionomer resins.

The polyurethane resin or the polyurethane elastomer (hereinafter, merely referred to as "urethane resin") constituting the cover includes a two-component curing type urethane resin obtained by curing an isocyanate group terminated urethane prepolymer with an aromatic polyamine or a thermoplastic urethane resin. The polyisocyanate component constituting the urethane resin is not limited, as long as it has at least two isocyanate groups. Examples of the polyisocyanate include an aromatic polyisocyanate such as 2,4-tolylene diisocyanate, 2,6-tolylene diisocyanate, a mixture of 2,4-tolylene diisocyanate and 2,6-tolylene diisocyanate (TDI), 4,4'-diphenylmethane diisocyanate (MDI), 1,5-naphthylene diisocyanate (NDI), 3,3'-bitolylene-4,4'-diisocyanate (TODI, xylylene diisocyanate (XDI), tetramethylxylylene-diisocyanate (TMXDI), para-phenylene diisocyanate (PPDI); an alicyclic polyisocyanate or aliphatic polyisocyanate such as 4,4'-dicyclohexylmethane diisocyanate ($H_{12}$MDI), hydrogenated xylylenediisocyanate ($H_6$XDI), hexamethylene diisocyanate (HDI), isophorone diisocyanate (IPDI), and norbornene diisocyanate (NBDI). These may be used either alone or as a mixture of at least two of them. In view of improving the weather resistance, as the polyisocyanate component of the urethane resin, a non-yellowing type polyisocyanate such as TMXDI, XDI, HDI, $H_6$XDI, IPDI, $H_{12}$MDI and NBDI is preferably used.

The polyol component constituting the urethane resin is not particularly limited as long as it has a plurality of hydroxyl groups, and such examples include a low-molecular weight polyol and a high-molecular weight polyol. Examples of the low-molecular weight polyol include a diol such as ethylene glycol, diethylene glycol, triethylene glycol, propanediol, dipropylene glycol, 1,3-butanediol, 1,4-butanediol, neopentyl glycol, 1,6-hexanediol; a triol such as glycerin, trimethylol propane, and hexanetriol. Examples of the high-molecular weight polyol include a polyether polyol such as polyoxyethylene glycol (PEG), polyoxypropylene glycol (PPG), and polyoxytetramethylene glycol (PTMG); a condensed polyester polyol such as polyethylene adipate (PEA), polybutylene adipate (PBA), and polyhexamethylene adipate (PHMA); a lactone polyester polyol such as poly-E-caprolactone (PCL); a polycarbonate polyol such as polyhexamethylene carbonate; and an acrylic polyol. The above polyols may be used alone or as a mixture of at least two of them.

The aromatic polyamine has no limitation as long as it has at least two amino groups directly or indirectly bonded to an aromatic ring. Examples of the aromatic polyamine are a type such as phenylenediamine, tolylenediamine, and diethyltoluenediamine, wherein amino groups are directly bonded to an aromatic ring; a type such as dimethylthiotoluenediamine wherein amino groups are bonded to an aromatic ring via a sulfide bond; a type such as xylylenediamine wherein amino groups are bonded to an aromatic ring via a lower alkylene group; and 4,4'-diaminodiphenylmethane or derivatives thereof.

The cover of the golf ball of the present invention may contain a pigment component such as a white pigment (for example, titanium oxide or zinc oxide) and a blue pigment, a weight adjusting agent such as calcium carbonate and barium sulfate, a dispersant, an antioxidant, an ultraviolet absorber, a light stabilizer, a fluorescent material or a fluorescent brightener, as long as the performance of the cover does not deteriorate.

The content of the white pigment (for example, titanium oxide) is preferably 0.5 part by mass or more, more preferably 1 part by mass or more, and is preferably 10 parts by mass or less, more preferably 8 parts by mass or less based on 100 parts by mass of the resin component. The white pigment in an amount of 0.5 part by mass or more can impart opacity to the cover, while the white pigment in an amount of more than 10 parts by mass may lower the durability of the cover.

In the present invention, the thickness of the cover of the golf ball is preferably 0.3 mm or more, more preferably 0.5 mm or more, even more preferably 1.0 mm or more, and is preferably 5.0 mm or less, more preferably 4.6 mm or less, even more preferably 2.5 mm or less. If the thickness of the cover is less than 0.3 mm, since the cover is too thin, the durability of the cover may deteriorate. If the thickness of the cover is more than 5.0 mm, the shot feeling of the golf ball may deteriorate.

The method for producing a golf ball of the present invention comprises the steps of selecting an organic sulfur compound from at least one organic sulfur compound represented by the above formulae (1) to (3) such that a sum of substituent constants of the substituents X in a structure represented by the above formula (4) is 0.2 or more and SP value of the structure represented by the above formula (4) is in a range from 19.0 $(J/cm^3)^{1/2}$ to 24.0 $(J/cm^3)^{1/2}$, blending the selected organic sulfur compound, (a) a base rubber, (b) a co-crosslinking agent, and (c) a crosslinking initiator to prepare a rubber composition, and forming at least a part of a constituting member of the golf ball from the rubber composition.

In a preferable embodiment, the method for producing a golf ball of the present invention comprises the steps of selecting an organic sulfur compound from at least one organic sulfur compound represented by the above formulae (1) to (3) such that a sum of substituent constants of the substituents X in a structure represented by the above formula (4) is 0.2 or more and SP value of the structure represented by the above formula (4) is in a range from 19.0 $(J/cm^3)^{12}$ to 24.0 $(J/cm^3)^{1/2}$, blending the selected organic sulfur compound, (a) a base rubber, (b) a co-crosslinking agent, and (c) a crosslinking initiator to prepare a rubber composition, forming at least one layer of a core from the rubber composition, and forming a cover covering the core.

The blending of the organic sulfur compound selected according to the method for selecting the organic sulfur compound of the present invention, the base rubber, the co-crosslinking agent, and the crosslinking initiator to prepare a rubber composition is carried out by kneading homogenously using, for example, a kneader like a kneading roll appropriately.

The step of forming a part of the constituting members of the golf ball from the rubber composition is conducted by molding the kneaded rubber composition in molds. The conditions of molding is not limited and the molding is preferably carried out for 10 to 60 minutes at the temperature of 130° C. to 200° C. under the pressure of 2.9 MPa to 11.8 MPa. For example, the rubber composition is preferably heated at the temperature of 130° C. to 200° C. for 10 to 60 minutes, or the rubber composition is preferably heated at two steps, for example, for 20 to 40 minutes at the temperature of 130° C. to 150° C., and continuously for 5 to 15 minutes at the temperature of 160° C. to 180° C.

In the case of the one-piece golf ball, the golf ball body is formed from the above rubber composition. In the case of the multi-layered core, at least one layer of the center and the intermediate layer is formed from the above rubber composition. For example, only the center is formed from the above rubber composition or both of the center and the intermediate layer are formed from the above rubber composition.

One example of the process for forming the intermediate layer is to cover the center with the intermediate layer composition to form an intermediate layer. The process for forming the intermediate layer is not particularly limited. In one embodiment, the intermediate layer composition is molded into hemispherical half shells in advance, and then the center is covered with two half shells and press-molded at the temperature of 130° C. to 170° C. for 1 to 5 minutes. In another embodiment, the intermediate layer composition is injection-molded directly onto the center so as to cover the center.

An embodiment for molding a cover is not particularly limited, and includes an embodiment which comprises molding the cover composition into a hollow-shell, covering the core with a plurality of the hollow-shells and subjecting the core with a plurality of the hollow shells to the compression-molding (preferably an embodiment which comprises molding the cover composition into a half hollow-shell, covering the core with the two half hollow-shells, and subjecting the core with the two half hollow-shells to the compression-molding) or an embodiment which comprises injection molding the cover composition directly onto the core.

After the cover is molded, the mold is opened and the golf ball body is taken out from the mold, and as necessary, the golf ball body is preferably subjected to surface treatments such as deburring, cleaning, and sandblast. If desired, a paint film or a mark may be formed. The paint film preferably has a thickness of, but not limited to, 5 μm or larger, and more preferably 7 μm or larger, and preferably has a thickness of 25 μm or smaller, and more preferably 18 μm or smaller. If the thickness is smaller than 5 μm, the paint film is easy to wear off due to continued use of the golf ball, and if the thickness is larger than 25 μm, the effect of the dimples is reduced, resulting in lowered flying performance of the golf ball.

When the golf ball of the present invention has a diameter in a range from 40 mm to 45 mm, a compression deformation amount of the golf ball (an amount of compression of the golf ball in the compression direction thereof) when applying an initial load of 98 N to a final load of 1275 N to the golf ball is preferably 2.0 mm or more, more preferably 2.2 mm or more, and is preferably 4.0 mm or less, more preferably 3.5 mm or less. If the compression deformation amount is 2.0 mm or more, the golf ball does not become excessively hard, and thus exhibits the good shot feeling. On the other hand, if the compression deformation amount is 4.0 mm or less, the resilience is enhanced.

EXAMPLES

Hereinafter, the present invention will be described in detail by way of example. The present invention is not limited to examples described below. Various changes and modifications can be made without departing from the spirit and scope of the present invention.

[Evaluation]

(1) Compression Deformation Amount (mm)

A compression deformation amount of the golf ball (a shrinking amount of the golf ball in the compression direction thereof), when applying a load from 98 N as an initial load to 1275 N as a final load to the golf ball, was measured.

(2) Coefficient of Restitution

A 198.4 g of metal cylindrical object was allowed to collide with each golf ball at a speed of 40 m/sec, and the speeds of the cylindrical object and the golf ball before and after the collision were measured. Based on these speeds and the mass of each object, coefficient of restitution for each golf ball was calculated. The measurement was conducted by using twelve of each golf ball, and the average value was regarded as the coefficient of restitution for the golf ball. The coefficient of restitution of each golf ball was represented by a difference from the the coefficient of restitution of the golf ball No. 7.

[Production of Cores]

The rubber compositions having formulations shown in Table 2 were kneaded with a kneading roll and heat-pressed in upper and lower molds, each having a hemispherical cavity, at a temperature of 170° C. for 20 minutes to obtain the spherical cores having a diameter of 39.8 mm. The formulations of the core were adjusted to make the golf ball to be evaluated have the same compression deformation amount (3.5 mm).

TABLE 2

| Rubber composition No. | 1 | 2 | 3 | 4 | 5 | 6 | 7 |
|---|---|---|---|---|---|---|---|
| Polybutadiene rubber | 100 | 100 | 100 | 100 | 100 | 100 | 100 |
| Zinc acrylate | 30 | 30 | 30 | 30 | 30 | 30 | 30 |
| Zinc oxide | 5 | 5 | 5 | 5 | 5 | 5 | 5 |
| Dicumyl peroxide | 0.4 | 1.0 | 0.9 | 0.3 | 1.0 | 1.0 | 0.3 |
| 2,4,6-tri(trifluoromethyl)-3,5-dichlorothiophenol | 0.77 | — | — | — | — | — | — |
| 2,4,6-tri(acetyl)-3,5-dichlorothiophenol | — | 0.61 | — | — | — | — | — |
| 2,4,6-tri(methoxycarbonyl)thiophenol | — | — | 0.57 | — | — | — | — |
| 2,3,4,5,6-penta(trifluoromethyl)thiophenol | — | — | — | 0.90 | — | — | — |
| 2,4,6-tri(cyano)-3,5-dichlorothiophenol | — | — | — | — | 0.51 | — | — |
| 2,4,6-tri(methoxy)thiophenol | — | — | — | — | — | 0.40 | — |
| Substituent constant of substituents X | 0.54 | 0.5 | 0.45 | 0.54 | 0.66 | −0.39 | — |
| SP Value of the structure in the formula (4) | 19.72 | 20.32 | 20.94 | 18.65 | 24.37 | 19.23 | — |
| Coefficient of Restitution of golf ball | 0.03 | 0.025 | 0.02 | 0.012 | 0 | 0 | 0 |

Formulation: parts by mass

Polybutadiene rubber: "BR-730 (high-cis polybutadiene)" manufactured by JSR Corporation (cis-1,4 bond content=96 mass %, 1,2-vinyl bond content=1.3 mass %, Mooney viscosity ($ML_{1+4}$ (100° C.))=55, molecular weight distribution (Mw/Mn)=3). Zinc acrylate: "ZNDA-90S" manufactured by Nihon Jyoryu Kogyo Co., Ltd. Zinc oxide: "Ginrei R" manufactured by Toho Zinc Co., Ltd. Dicumyl peroxide: "Percumyl (registered trademark) D" manufactured by NOF Corporation.

(2) Forming the Cover

The materials shown in Table 3 were mixed using a twin-screw kneading extruder to obtain the cover composition in the form of pellet. The extrusion was conducted in the following conditions: screw diameter=45 mm, screw revolutions=200 rpm, and screw L/D=35. The cover composition was heated to from 150° C. to 230° C. at the die position of the extruder. The cover composition thus prepared was directly injection-molded onto the core, thereby producing golf balls having a core and a cover (thickness: 1.45 mm) covering the core. The coefficient of restitution of the obtained golf ball was evaluated. The results were also shown in Table 2.

TABLE 3

| Cover material | Amount (parts) |
|---|---|
| Himilan 1706 | 30 |
| Himilan 1707 | 30 |
| Himilan 1605 | 40 |
| Titanium oxide | 2 |
| Barium sulfate | 4 |

Note on table 3:
HIMILAN 1706: an ionomer resin of a zinc ion-neutralized ethylene-methacrylic acid copolymer, available from MITSUI-DUPONT POLYCHEMICAL
HIMILAN 1707: an ionomer resin of a sodium ion-neutralized ethylene-methacrylic acid copolymer, available from MITSUI-DUPONT POLYCHEMICAL
HIMILAN 1605: an ionomer resin of a sodium ion-neutralized ethylene-methacrylic acid copolymer, available from MITSUI-DUPONT POLYCHEMICAL The results of table 2 shows that the golf balls using the organic sulfur compound including at least one organic sulfur compound represented by the above formulae (1) to (3), wherein a sum of substituent constants of the substituents X in a structure represented by a following formula (4) is 0.2 or more and SP value of the structure represented by the following formula (4) is in a range from 19.0 $(J/cm^3)^{1/2}$ to 24.0 $(J/cm^3)^{1/2}$ have high resilience.

The golf ball of the present invention has high resilience.

This application is based on Japanese Patent application No. 2010-266800 filed on Nov. 30, 2010, the contents of which are hereby incorporated by reference.

The invention claimed is:

1. A golf ball having a constituting member, wherein at least a part of the constituting member is formed from a rubber composition containing (a) a base rubber,
(b) a co-crosslinking agent, (c) a crosslinking initiator, and (d) an organic sulfur compound, wherein (d) the organic sulfur compound includes at least one organic sulfur compound represented by one of the following formulae (1) to (3), and is such that a sum of substituent constants of the substituents X in a structure represented by a following formula (4) is 0.2 or more and an SP value of the structure represented by the following formula (4) is in a range from 19.0 $(J/cm^3)^{1/2}$ to 24.0 $(J/cm^3)^{1/2}$:

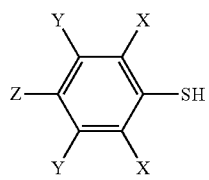

(1)

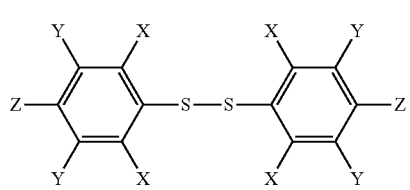

(2)

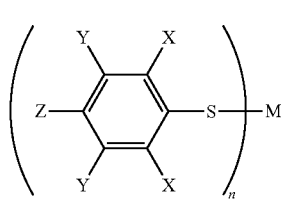

(3)

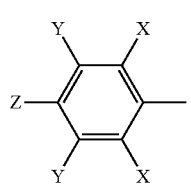

(4)

wherein substituent X is at least one of $CF_3$, $COCH_3$, and $COOCH_3$; substituent Y is Cl or Br; substituent Z is at least one of $CF_3$, $COCH_3$, $COOCH_3$ Cl, Br, and H; and wherein substituents X, Y, Z may be the same or different in the formulae (1) to (4), n is a natural number equal to or larger than 1, and M represents a metal having a valance equal to or larger than 1 in the formula (3).

2. The golf ball according to claim 1, wherein the sum of substituent constants of the substituents X is 0.45 or more.

3. The golf ball according to claim 1, wherein the SP value of the structure represented by the formula (4) is in a range from 19.0 $(J/cm^3)^{1/2}$ to 23.0 $(J/cm^3)^{1/2}$.

4. The golf ball according to claim 1, wherein the SP value of the structure represented by the formula (4) is in a range from 19.0 $(J/cm^3)^{1/2}$ to 21.5 $(J/cm^3)^{1/2}$.

5. The golf ball according to claim 1, wherein the rubber composition contains
15 parts by mass to 45 parts by mass of (b) the co-crosslinking agent,
0.2 part by mass to 5.0 parts by mass of (c) the crosslinking initiator, and
0.05 part by mass to 3.0 parts by mass of (d) the organic sulfur compound, with respect to 100 parts by mass of (a) the base rubber.

6. The golf ball according to claim 1, wherein the golf ball is a two-piece golf ball comprises a core and a cover covering the core, wherein the core is formed from the rubber composition.

7. The golf ball according to claim 1, wherein the golf ball is a multi-piece golf ball comprising a core having a center and at least one intermediate layer covering the center, and a cover covering the core, wherein at least a part of the center and/or the intermediate layer is formed from the rubber composition.

8. The golf ball according to claim 1, wherein the golf ball is a one-piece golf ball comprising a golf ball body, wherein the golf ball body is formed the rubber composition.

9. A method for producing a golf ball comprising the steps of
selecting an organic sulfur compound from at least one organic sulfur compound represented by following formulae (1) to (3) such that a sum of substituent constants of the substituents X in a structure represented by a following formula (4) is 0.2 or more and an SP value of the structure represented by the following formula (4) is in a range from 19.0 $(J/cm^3)^{1/2}$ to 24.0 $(J/cm^3)^{1/2}$,
blending the selected organic sulfur compound, (a) a base rubber, (b) a co-crosslinking agent, and (c) a crosslinking initiator to prepare a rubber composition, and
forming at least a part of a constituting member of the golf ball from the rubber composition:

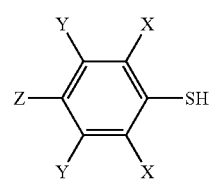

(1)

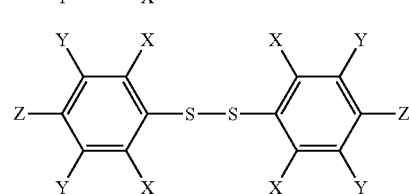

(2)

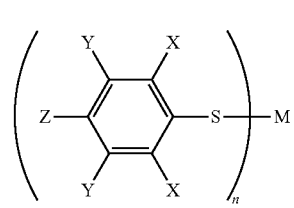

(3)

-continued
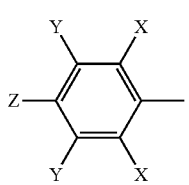
(4)
wherein substituent X is at least one of $CF_3$, $COCH_3$, and $COOCH_3$; substituent Y is Cl or Br;
substituent Z is at least one of $CF_3$, $COCH_3$, $COOCH_3$ Cl, Br, and H; and
wherein substituents X, Y, Z may be the same or different in the formulae (1) to (4), n is a natural number equal to or larger than 1, and M represents a metal having a valance equal to or larger than 1 in the formula (3).
* * * * *